United States Patent Office 3,296,210
Patented Jan. 3, 1967

3,296,210
COPOLYMERS OF TRIOXAN WITH ALLYL ESTERS AND PROCESS FOR THEIR PRODUCTION
Walter Wilson, Northfield, Birmingham, and Herbert May, Edgbaston, Birmingham, England, assignors to British Industrial Plastics Limited, London, England, a company incorporated of the United Kingdom
No Drawing. Filed May 18, 1962, Ser. No. 195,996
Claims priority, application Great Britain, May 26, 1961, 19,197/61
16 Claims. (Cl. 260—73)

The present invention relates to novel polymeric products which can be obtained from trioxan and to the preparation of these polymeric products.

It has been discovered that valuable polymeric products can be prepared by reacting trioxan with allyl ethers and esters and other allyl compounds under substantially anhydrous conditions and in the presence of electrophilic catalysts.

Accordingly, the present invention provides a process for the preparation of valuable polymeric products which comprises reacting trioxan under substantially anhydrous conditions in the presence of an electrophilic catalyst with an allyl compound.

In accordance with the present invention, polymeric products can be obtained using, for example, such allyl compounds as allyl acetate, allyl ethyl ether, allyl bromide, allyl methacrylate, allyl cellosolve, allyl cyanide, allyl benzene, allyl glycidyl ether, allyl alcohol, allyl beta-cyclohexyl propionate, allyl phenyl ether and diallyl phenyl phosphate.

Valuable products may also be obtained by reacting trioxan with an allyl compound and at least one other compound capable of copolymerising with trioxan in the presence of an electrophilic catalyst. Examples of particularly suitable compounds which can be reacted with trioxan and one or more allyl compound in accordance with the present invention are the cyclic ethers disclosed in French patent specification No. 1,221,148 and the compounds which are disclosed in our copending U.S. patent applications Serial Nos. 123,348, 144,843, 152,934, 177,236 and 177,256, and in our copending U.K. patent applications Nos. 8378/61, 21567/61 and 21568/61 as suitable for use in preparing polymeric products by reaction with trioxan.

The specification filed in our copending U.S. patent application Serial No. 123,348 describes the preparation of polymeric products by the reaction of trioxan with cyclic carboxylic esters which are substantially more reactive towards trioxan than are gamma-lactones. Such cyclic esters are those in which the ester ring contains at least three carbon atoms and at least one oxygen atom excluding esters having 5-membered rings other than those also containing an ether linkage. The preparation of polymeric products by the reaction of trioxan with such cyclic esters together with allyl ethers and esters has however, been claimed in our U.S. patent application No. 123,348.

Our copending U.S. patent application No. 144,843 describes the preparation of valuable polymeric products by the reaction of trioxan with at least one aldehyde and it is stated that aldehydes containing electro-negative substituent groups, such as halogenated aliphatic aldehydes for example chloral, and aromatic aldehydes for example benzaldehyde, anisaldehyde and cinnamaldehyde, may usefully be used. The preparation of polymeric products by the reaction of trioxan with such aldehydes and substituted aldehydes together with allyl ethers and esters has, however, been claimed in our U.S. patent application No. 144,843.

In the specification filed on our copending U.S. patent application Serial No. 152,934, we have described the preparation of useful polymeric products from trioxan and styrene and styrene derivatives. Examples of suitable compounds which can be used in the process of that specification and which are suitable for use in the process of the present invention are styrene, alpha-substituted styrenes such as alpha-methyl styrene and alpha-phenyl styrene, ring-substituted styrenes such as o-, m- and p-methyl styrene, styrenes which are both beta- and ring-substituted such as anethole (p-methoxy beta-methyl styrene), ring-substituted styrenes in which the ring substituents are joined together to form another ring such as 1-vinyl naphthalene and 2-vinyl naphthalene, beta-substituted styrenes such as stilbene (beta-phenyl styrene) and beta-substituted styrenes in which the beta-substituent is linked to the phenyl ring of the styrene to form a ring such as indene, coumarone and acenaphthylene. The preparation of polymeric products by the reaction of trioxan with styrene and such substituted styrenes together with allyl ethers and esters has, however, been claimed in our U.S. patent application No. 152,934.

In the complete specification of our copending U.K. patent application No. 8378/61, we describe the preparation of useful polymeric products from trioxan and vinyl ethers. Examples of suitable vinyl ethers which can be used in the process of that invention and which are suitable for reaction with trioxan and allyl compounds are alkyl, aryl, aralkyl, and cycloalkyl vinyl ethers such as methyl vinyl ether, ethyl vinyl ether, n-butyl vinyl ether, isobutyl vinyl ether, vinyl 2-ethylhexyl ether and phenyl vinyl ether; cyclic ethers having a vinyl side chain such as 2-vinyl 1,3-dioxan; and cyclic ethers containing an ethylenically unsaturated group adjacent to an oxygen atom in the ring such as 2,3-dihydrofuran.

In the specification of our copending U.S. patent application No. 177,236, we describe and claim the preparation of useful polymeric products from trioxan and N-vinyl and C-vinyl substituted derivatives of heterocyclic compounds. Examples of suitable compounds which can be used in the process of that invention and which are suitable for reaction with trioxan and allyl compounds in the process of the present invention are N-vinyl carbazole and 2-vinyl pyridine. The preparation of polymeric products by the reaction of trioxan with such N-vinyl and C-vinyl substituted derivatives of heterocyclic compounds together with allyl ethers and esters has, however, been claimed in our U.S. patent application No. 177,236.

In our copending U.S. patent application No. 177,256 we have described the reaction of trioxan with aliphatic and alicyclic unsaturated hydrocarbons and such compounds are also suitable for use with allyl compounds in the process of the present invention. Examples of suitable aliphatic and alicyclic unsaturated hydrocarbons are isobutene, butadiene, isoprene, pentadiene-1,3, cyclohexene, heptene-1, octene-1, cyclopentadiene, 4-vinyl cyclohexane and beta-pinene. The preparation of polymeric products by the reaction of trioxan with such aliphatic and alicyclic unsaturated hydrocarbons together with allyl ethers and esters has, however, been claimed in our copending U.S. patent application Serial No. 177,256.

In our copending U.K. patent application No. 21567/61, we have described the reaction of trioxan with at least one compound containing one or more isocyanate groups and such compounds are also suitable for use together with allyl compounds in the process of the present invention. Examples of suitable isocyanate group-containing compounds are aliphatic isocyanates and aromatic isocyanates such as phenyl isocyanate and toluene 2,4-di-isocyanate.

In our copending U.K. patent application No. 21568/61, we have described the reaction of trioxan with at least one compound containing one or more nitrile groups and such compounds are also suitable for use together with allyl compounds in the process of the present invention. Particularly suitable nitrile group-containing compounds are aliphatic saturated nitriles such as acetonitrile, adiponitrile and succinonitrile, unsaturated nitriles such as acrylonitrile, aromatic nitriles such as benzonitrile and polymeric substances containing nitrile groups such as polyacrylonitrile and styrene-acrylonitrile copolymers.

As hereinbefore stated, the reaction is carried out in the presence of an electrophilic catalyst and particularly suitable electrophilic catalysts which can be used in the process of the present invention are:

(1) Metal and metalloidal fluorides, chlorides and a few bromides, belonging to the general class of catalysts which are usually effective as catalysts in the Friedel-Crafts acylation reaction. Boron trifluoride which is a gaseous catalyst and boron trichloride which is a volatile liquid are particularly suitable for processes carried out in the absence of an inert liquid medium. Such catalysts are well described in the literature, for example in the following articles or books:

N. O. Calloway, Chemical Reviews, 1935, 17, 327–331, 374–377; C. C. Dermer, D. M. Wilson, P. M. Johnson, and V. H. Dermer, J. Amer. Chem. Soc., 1941, 63, 2881–2883; E. E. Royals, "Advanced Organic Chemistry," published by Constable, London, p. 467; C. W. Wheland, "Advanced Organic Chemistry," second edition, published by Chapman & Hall, London, 1949, pages 80, 83; and V. Migrdichian, "Organic Synthesis," published by Reinhold, New York, 1957, page 628.

Those catalysts most effective in the classical Friedel-Crafts acylation reaction are not always the best in the process of the present invention. We have found that boron trifluoride, stannic chloride and ferric chloride are particularly useful; boron trichloride, stannic bromide, zinc chloride and antimony pentachloride and other compounds which are exemplified later are also effective.

(2) Complexes of catalysts defined in (1) with water and with organic compounds in which the donor atom is oxygen or sulphur, for example alcohols, ethers, carboxylic acids or dialkyl sulphides. Useful catalysts in this range are ether complexes such as the complexes of diethyl ether with boron trifluoride, stannic chloride, stannic bromide, boron trichloride and ferric chloride, and of boron trifluoride with acetic acid, butyl alcohol or water. When the preferred process is carried out in the presence of an inert liquid medium, it is advantageous for the catalysts to be soluble in this medium; this is particularly the case when the polymerisation is carried out at a temperature below 60° C. The complexes of boron trifluoride with ethers containing more than 7 carbon atoms such as dibutyl and di-isoamyl ethers, which complexes are soluble in solvents such as hexane, are, therefore, particularly suitable.

(3) Non-oxidising inorganic acids and the complexes thereof with boron trifluoride. Examples are dihydroxyfluoroboric acid, polyphosphoric acid and its complex with boron trifluoride and the complex of boron trifluoride with phosphoric acid.

(4) Complexes of boron trifluoride with very weakly basic nitrogen compounds, in which complexes the nitrogen atom is the donor atom. Examples are the complexes with diphenylamine and N-phenyl 1 or 2 naphthylamine and acetamide. The complexes of boron trifluoride with stronger bases such as ammonia and aliphatic amines are, however, useless as catalysts in the process of the present invention.

(5) Halogens and interhalogen compounds, for example, bromine, iodine, iodine monobromide, iodine monochloride and iodine trichloride.

(6) Oxonium salts. Examples are trialkyloxonium borofluorides such as triethyloxonium borofluoride ($Et_3O^+BF_4^-$) triethyloxonium tetrachloro-aluminate ($Et_3O^+AlCl_4^-$) and triethyloxonium hexachloroantimonate ($Et_3O^+SbCl_6^-$). These and other suitable oxonium salts may be prepared, for example by the methods described by N. Meerwein, N. Battenberg, N. Gold, S. Pfeil, and C. Willfang in J. Prakt. Chem., 1939, 154, 83–156.

The reaction is preferably effected in the presence of an inert liquid medium. This inert medium, which should be well dried, enables the reaction to be carried out in a controlled manner by ensuring uniform distribution of the catalyst and reactants and by faciliating dissipation of the heat of reaction. The use of a liquid medium is also advantageous in giving the product in the form of an easily handled slurry. The inert liquid medium may be one in which the trioxan, the allyl compound, other reactants if any, and the catalyst are dissolved at the temperature employed. One or more of the reactants (trioxan, allyl compound, other reactants and catalyst) may, however, be dispersed or partly dispersed and partly dissolved in a finely divided form in the liquid medium. Examples of suitable inert liquid media are saturated aliphatic and cycloaliphatic hydrocarbons, chlorinated aliphatic and cycloaliphatic hydrocarbons such as dichloromethane, aliphatic and aromatic nitro-hydrocarbons and carboxylic esters. Particularly advantageous results have been obtained using n-hexane which dissolves a minor proportion of the trioxan and light petroleum fractions in the hexane range which have a boiling point between 60 and 70° C. and which consist mainly of normal paraffins have also been used with success.

If the allyl compound and other reactants, if used, are soluble in or miscible with molten trioxan, the reaction may be effected without the use of an inert liquid medium.

The reaction will generally be carried out at a temperature between —100° C. and 100° C. and preferably between 40° C. and 70° C. The amount of allyl compound and other reactants, if used, may vary from 0.1 to 99% by weight but the preferred amount is from 0.5 to 20% by weight of the total weight of reactants. As hereinbefore stated, the reaction must be carried out under substantially anhydrous conditions and most satisfactory results are obtained when the water content of the reaction system is less than 0.1%, preferably less than 0.05%, by weight.

As the reaction proceeds, fresh trioxan, allyl compound and other reactants, if any, may be continuously or progressively introduced into the reaction zone in which the catalyst is already present or into which the catalyst is likewise continuously or progressively introduced. If desired, the reaction can be carried out as a completely continuous process by continuously or progressively withdrawing the polymeric product which is produced.

The reaction is preferably carried out under a dry inert atmosphere such as nitrogen and/or carbon dioxide suitably at atmospheric pressure although higher pressures may be employed.

It should be noted that the allyl compound may be partially polymerised prior to its reaction with the trioxan. This can conveniently be effected by partially polymerising the allyl compound in solution with the catalyst in an inert liquid medium, such as hexane, and then adding the solution of the allyl compound partial polymer containing the catalyst to a dispersion of trioxan in an inert liquid medium, such as hexane. When certain other compounds capable of copolymerising with trioxan are reacted with trioxan and allyl compounds in accordance with the present invention, these other compounds may be partially polymerised or partially reacted with trioxan or the allyl compound prior to the introduction into the reaction zone of the other reactant or reactants. For instance, 1,3-dioxolan may be partially polymerised with the catalyst in solution in cyclohexane and/or dispersed in n-hexane and the resulting solution or dispersion of the partially polymerised cyclic ether containing the catalyst then added to a solution or dispersion of trioxan and an allyl compound in an inert liquid medium such as n-hexane. The reaction of allyl compounds with partially polymerised trioxan has, however, proved difficult in view of the rapidity of the polymerisation reaction of trioxan.

At the end of the reaction, an organic solvent such as acetone or dichloromethane or an aqueous solution of a complexing agent suitable for the particular metallic or metalloidal ion may be added and the polymeric product filtered off and washed with more solvent or solution. The purpose of this washing is to remove any unreacted trioxan, allyl compound, and/or other reactants which may thus be recovered, and to remove at least part of the catalyst residues.

It is valuable to effect a substantially complete removal of catalyst residues from the polymeric material and this removal can advantageously be carried out by reducing the polymeric product into a finely divided state suitably by ball-milling in the presence of an extraction liquid for the catalyst residues which are freed, for example, by milling. The extraction liquid may be an organic solvent, for example, acetone or dichloromethane in which the catalyst dissolves, or it may be a solution of a complexing agent for the metallic or metalloidal ions of the catalyst, for example ammonia or hydrazine, or a sequestering agent. More details of the factors which govern the selection of a suitable extraction liquid and of the removal of catalyst residues are given in U.S. patent application Serial No. 39,773 and, from that specification, it will be seen that the catalyst removal process should leave the product in either a neutral or slightly alkaline condition. It is for this reason that, if a strongly alkaline or acidic extraction liquid is used to remove the metallic or metalloidal part of the catalyst residue, it is essential to render the treated polymeric product neutral or slightly alkaline by removing all traces of acid and caustic alkali. This can conveniently be done by giving the product a final treatment with a hot dilute aqueous solution of a weak base, such as ammonia, triethanolamine, hydrazine or an amine.

The thermal stabilities of the products of the present invention, as expressed by the rate of loss of weight at 222° C. ($K_{222}$) measured by the method described by Schweitzer, Macdonald and Punderson in the Journal of Applied Polymer Science, 1959, 1, 1960, are such that in some cases the product can be used without further stabilisation. However, some products do require such stabilisation and others benefit by such stabilisation insofar as their initial thermal stabilities, as determined by the percentage loss of weight during the first thirty minutes of heating at 222° C., are improved. It is important for the products to have a high initial thermal stability, if they are to be moulded, for satisfactory mouldings to be obtained by conventional moulding processes.

Such further stabilisation of the products can be obtained by incorporating therein substances which react with any free end groups and typically reactive substances for this purpose are identified in U.K. patent specification No. 557,873 and include acid anhydrides and isocyanates. The products of the present invention are preferably stabilised by the incorporation therein of anti-oxidants for example aromatic amines such as N-phenyl-1-naphthylamine, N-phenyl-2-naphthylamine, diphenylamine and di-2-naphthyl-p-phenylenediamine, and bisphenols such as 2,6-bis (2'-hydroxy-3'-tertiary butyl-5'-methyl benzyl) 4'-methyl phenol, ultra-violet light absorbing substances for example substituted benzophenones such as 2,2'-dihydroxy-4,4'-dimethoxy-benzophenone and 2-hydroxy-4-methoxy-benzophenone; and substances capable of reacting with formaldehyde, for example hydrazines, ureas and thioureas such as ethylene urea and phenyl thiourea, phenols such as 2-methyl-4,6-di-tert-butyl phenol and polyamines.

Further stabilisation of the products may be effected by the incorporation therein of a polymeric substance containing —CO—NH— groups in accordance with the process described in our copending U.S. patent application No. 136,179. Examples of suitable polymeric substances which can be used for this purpose are polyamides, polyurethanes, polyureas, polyacrylamides and polypeptides.

Although the polymeric products stabilised by the above methods can usefully be used for the production of plastic moulding compositions, films, fibres and protective coatings, they may possess the disadvantage to a varying degree of evolving gas during normal injection moulding. This liberation of gas causes the formation of bubbles and faults in moulded products and, in order to avoid this evolution of gas, it is advantageous to give the product a heat treatment in accordance with the process described in our copending U.S. patent application No. 146,448. Full details of the conditions which should be used for this heat treatment are given in the last mentioned copending application but, by way of example, it may be mentioned that it is generally satisfactory to heat the product in an oven at atmospheric pressure in an atmosphere of nitrogen or another inert gas for 10 to 20 minutes at a temperature of 220° C.

The products of the present invention are useful industrial products and exhibit a wide range of properties which vary depending upon the nature of the allyl compound and on the relative proportions of the allyl compound, other reactants, if any, and the trioxan in the product; those products which contain a large proportion of trioxan and a small proportion of the allyl compound resemble polyoxymethylenes. Many of these polymeric products are useful in the manufacture of plastic moulding compositions, films, fibres and protective coatings and, for such applications, the products may be mixed with lubricants, fillers and pigments in addition to the anti-oxidants and stabilisers hereinbefore mentioned.

In order to obtain a good product it is desirable that the reactants be in a high state of purity. As commercial trioxan normally contains traces of acids such as formic acid, it is important to purify it before using it in the process of the invention. It has been found that simple fractional distillation or crystallisation is insufficient to remove these traces of acid but that they can be removed by fractional distillation of the trioxan in the presence of certain basic substances, such as sodium hydroxide, potassium hydroxide and amines having a high boiling point, for example stearylamine; generally, about 0.1 to 0.5% by weight of such basic substances is sufficient.

The present invention is illustrated by the following examples, in which the trioxan used was purified by the above described fractional distillation process, and the other reagents which were used were also purified by fractional distillation, the hexane being obtained by fractional distillation of commercial hexane (B.P. 66–68° C.). The thermal decomposition rates ($K_{222}$ values) were determined by the method described by Schweitzer et al. in the aforementioned journal and in which the inherent viscosities are as measured at 60° C. as 0.5% by weight solutions in p-chlorophenol containing 2% by weight alpha-pinene.

*Example 1*

A mixture of 600 gms. of trioxan, 400 gms. of commercial hexane (B.P. 66–68° C.) and 15 gms. of allyl acetate was heated to 60° C. in a flask fitted with a reflux condenser in an atmosphere of nitrogen. The water content of the mixture was less than 0.01% as determined by the Karl Fischer method. To the rapidly agitated mixture there was added 1.0 ml. of boron trifluoride-diethyl ether complex. Polymerisation took place rapidly as indicated by a rise in temperature.

After the exothermic reaction was complete, 300 ml. of acetone containing 5 ml. of triethylamine were added with vigorous agitation. The resulting slurry was filtered and ball-milled for 16 hours with 1200 ml. of distilled water containing 60 ml. of 0.880 ammonia. The polymeric product was then filtered, washed once with 2000 ml. of acetone and finally dried in a vacuum oven at 60° C. A yield of 450 gm. of product was obtained having an inherent viscosity of 0.98.

A film compression moulded at 180° C. from the polymeric product obtained was tough and flexible and had a thermal decomposition rate ($K_{222}$) of 0.80% per min.

Example 2

A polymeric product was prepared from trioxan and allyl acetate using the method described in Example 1. The reaction conditions were identical to those of Example 1 but only 3 gm. of allyl acetate were used.

A yield of 440 gm. of a product having an inherent viscosity of 1.4 was obtained after removal of the catalyst residues in the manner described in Example 1 and a film compression moulded at 180° C. from the product obtained was tough and flexible and had a thermal decomposition rate ($K_{222}$) of 0.85% per min. The weight loss ($W^{30}_{222}$) of a 1 gm. sample of this product after 30 minutes at 222° C. was 23.5%. After stabilisation by the incorporation of 3% ethylene urea and 0.1% N-phenyl-1-naphthylamine, the $W^{30}_{222}$ value was reduced to 14 and the $K_{222}$ value to 0.34, whilst the inherent viscosity was unaffected.

The product containing the aforementioned stabilisers was further stabilised by heating in an oven at 220° C. for 30 minutes in the manner described in Example 4 of our copending U.S. patent application No. 146,448. The effect of this heat treatment was to reduce the inherent viscosity to 1.2, the $W^{30}_{222}$ value to 10 and the $K_{222}$ value to 0.22. Acetylation of the unstabilised polymer gave a product having an inherent viscosity of 1.04, a $W^{30}_{222}$ value of 20 and a $K_{222}$ value of 0.70. None of the aforementioned stabilisation treatments affected the flexibility of films moulded from the products to any significant extent.

Example 3

A polymeric product was prepared using the method described in Example 1 except that 6 gm. of allyl ethyl ether were used instead of the 15 gm. of allyl acetate.

A yield of 415 gm. of a polymeric product was obtained and a film compression moulded at 180° from this product was partially flexible and had a thermal decomposition rate ($K_{222}$) of 1.0% per min.

Example 4

A polymeric product was prepared using the method described in Example 1 except that 6 gm. of allyl bromide were used instead of the 15 gm. of allyl acetate.

A yield of 475 gm. of a polymeric product having an inherent viscosity of 1.04 was obtained and a film compression moulded at 180° C. from this product was tough and flexible and had a thermal decomposition rate ($K_{222}$) of 1.2% per min.

Example 5

A 100 ml. reaction flask was heated to remove any moisture which was present, and was then cooled in a stream of pure dry nitrogen. The flask was then charged with 20 g. trioxan, 10 g. cyclohexane and 2 g. allyl methacrylate, the water content of this reaction mixture being less than 0.01% by weight, as determined by the Karl Fischer method.

The reaction mixture was heated to 60° C. and was maintained at this temperature in an atmosphere of dry nitrogen. 0.02 ml. boron trifluoride-diethyl etherate was added to the reaction mixture, which was rapidly agitated, and polymerisation took place rapidly. After the reaction mixture had cooled to 50° C., about 50 mls. acetone, containing about 10% by volume triethylamine, were added with vigorous agitation. The resulting slurry was filtered, the polymeric product was washed, twice with about 50 mls. acetone, once with about 250 mls. of an approximately 2% aqueous ammonia solution, and once with about 250 mls. of acetone, and was finally dried in a vacuum oven at 60° C. to constant weight.

A polymeric product having an inherent viscosity of 1.27 was obtained, the yield being 67% by weight. A film, compression moulded at 190° C. from this product, was flexible, and had a thermal decomposition rate of 3.2% per minute.

Example 6

A 100 ml. reaction flask was heated to remove any moisture which was present and was then cooled in a stream of pure dry nitrogen. The flask was charged with 20 g. trioxan, 1 g. allyl methacrylate and 10 g. cyclohexane, the water content of this reaction mixture being less than 0.01% by weight as determined by the Karl Fischer method.

The reaction mixture was heated to 60° C. and was maintained at this temperature in an atmosphere of dry nitrogen. 0.02 mls. dihydroxyfluoroboric acid was added to the reaction mixture, which was rapidly agitated, and polymerisation took place rapidly. After the reaction mixture had cooled to 50° C., about 50 mls. acetone, containing about 10% by volume triethylamine, were added with vigorous agitation. The resulting slurry was filtered, and the polymeric product was washed twice, with about 50 mls. acetone, once with about 250 mls. of an approximately 2% by weight aqueous ammonia solution and once with about 250 mls. acetone, and was finally dried in a vacuum oven at 60° C. to constant weight.

A polymeric product, having an inherent viscosity of 0.49, was obtained, the yield being 65% by weight. A film, compression moulded at 190° C. from this product, was brittle.

Example 7

A 100 ml. reaction flask was heated to remove any moisture which was present and was then cooled in a stream of pure dry nitrogen. The flask was charged with 20 g. trioxan, 0.6 g. allyl Cellosolve, the ethyl allyl ether of ethylene glycol, and 10 g. cyclohexane, the water content of this reaction mixture being less than 0.01% by weight, as determined by the Karl Fischer method.

The reaction mixture was heated to 60° C. and was maintained at this temperature in an atmosphere of dry nitrogen. To the reaction mixture, which was rapidly agitated, was added 0.02 ml. stannic chloride. Polymerisation took place fairly rapidly. When the reaction mixture had cooled to 50° C., the polymeric product obtained was twice slurried with 50 mls. water and filtered. After the final filtration, the product was washed with a solution of 10 mls. triethanolamine in 10 mls. acetone and was finally dried in a vacuum oven at 60° C. to constant weight.

The yield of polymeric product was 25% by weight.

Example 8

A polymeric product was produced by the method described in Example 5, the reactants in this case being 20 g. trioxan, 0.5 g. allyl cyanide and 10 g. cyclohexane, and the polymerisation catalyst being 0.02 ml. borontrifluoride-diethyl etherate.

A polymeric product having an inherent viscosity of 0.91 was obtained, the yield being 55% by weight. A film, compression moulded at 190° C. from this product, was brittle, and had a thermal decomposition rate of 5.0% per minute.

Example 9

A polymeric product was produced by the method described in Example 5, the reactants in this case being 20 g. trioxan, 0.5 g. allyl beta-cyclohexanyl propionate and 10 g. cyclohexane, and the catalyst being 0.02 ml. boron trifluoride-diethyl etherate.

A polymeric product having an inherent viscosity of 1.56 was obtained, the yield being 75% by weight. A film, compression moulded at 190° C. from this product, was flexible and had a thermal decomposition rate of 0.73% per minute.

Example 10

A polymeric product was produced by the method described in Example 5, the reactants in this case being 20 g. of trioxan, 0.5 g. allyl glycidyl ether and 10 g. of cyclohexane, the catalyst being 0.02 ml. boron trifluoride-diethyl etherate.

A polymeric product, having an inherent viscosity of 1.24, was obtained, the yield being 60% by weight. A film, compression moulded at 190° C. from this product, was flexible and had a thermal decomposition rate of 0.87% per minute.

Example 11

A polymeric product was produced by the method described in Example 5, the reactants in this case being 20 g. trioxan, 0.4 g. allyl ethyl ether, 0.4 g. 1,3-dioxolan and 10 g. of cyclohexane, and the polymerisation catalyst being 0.02 ml. boron trifluoride-diethyl etherate.

A polymeric product, having an inherent viscosity of 1.22, was obtained, the yield being 85% by weight. A film, compression moulded at 190° C. from this product, was flexible and had a thermal decomposition rate of 0.15% per minute.

Example 12

A polymeric product was produced using the method of Example 5, the reactants in this case being 20 g. trioxan, 0.4 g. allyl phenyl ether, 0.4 g. butylene oxide and 10 g. cyclohexane. The polymerisation catalyst was 0.02 ml. boron trifluoride-diethyl etherate.

A polymeric product, having an inherent viscosity of 1.8 was obtained, the yield being 50% by weight. A film, compression moulded at 190° C. from this product, was brittle, and had a thermal decomposition rate of 0.74% per minute.

Example 13

A polymeric product was produced by the method of Example 5, the reactants in this case being 20 g. trioxan, 0.5 g. diallyl phenyl phosphate and 10 g. cyclohexane, and the catalyst being 0.02 ml. boron trifluoride-diethyl etherate.

A polymeric product, having an inherent viscosity of 2.54, was obtained, the yield being 75% by weight. A film, compression moulded at 190° C. from this product, was flexible, and had a thermal decomposition rate of 3.2% per minute.

Example 14

A polymeric product was produced by the method of Example 5, the reactants in this case being 20 g. trioxan, 0.5 g. allyl benzene and 10 g. cyclohexane. The catalyst was 0.02 ml. (n-BuO)BF$_2$.

A polymeric product, having an inherent viscosity of 1.50, was obtained, the yield being 80% by weight. A film, compression moulded at 190° C. from this product, was flexible and had a thermal decomposition rate of 0.68% per minute.

Example 15

A polymeric product was produced using the method described in Example 5, the reactants in this case being 20 g. trioxan, 0.4 g. allyl alcohol and 10 g. cyclohexane, and the catalyst being 0.02 ml. boron trifluoride diethyl etherate.

A polymeric product having an inherent viscosity of 0.73 was obtained, the yield being 35% by weight. A film, compression moulded at 190° C. from this product, was brittle and had a thermal decomposition rate of 0.46% per minute.

Example 16

A polymeric product was produced using the method described in Example 5, the reactants in this case being 20 g. trioxan, 0.4 g. allyl benzene, 0.4 g. acetonitrile and 10 g. cyclohexane. The catalyst was again 0.02 mls. boron trifluoride diethyl etherate.

A polymeric product, having an inherent viscosity of 0.59 was obtained, the yield being 70% by weight. A film, compression moulded at 190° C. from this product, was brittle.

Example 17

A 100 ml. reaction flask was heated to remove any moisture which was present and was cooled in a stream of pure dry nitrogen. The flask was then charged with 10 g. trioxan, 1 g. allyl alcohol and 200 g. dichloromethane, the water content of this reaction mixture being less than 0.01% by weight as determined by the Karl Fischer method.

The reaction mixture was maintained at −78° C. in an atmosphere of dry nitrogen, and a slow stream of boron trifluoride gas was then passed for two hours over the reactants. The resulting polymer was filtered off and the product was washed successively with 30 ml. portions of an approximately 2% by weight aqueous ammonia solution, once with about 30 mls. acetone and was finally dried in a vacuum oven at 60° C. to constant weight.

A yield of 70% by weight was obtained. The white polymeric product did not melt even on heating to 240° C.

What is claimed is:

1. A process for the preparation of a polymeric product in which the majority of the units are $CH_2O$ units which consists essentially in reacting trioxan with an allyl ester under substantially anhydrous conditions and in the presence of an electrophilic catalyst, in the range by weight of trioxan from 99.5 to 80% and allyl ester from 0.5% to 20%.

2. A process according to claim 1 in which trioxan is reacted with an allyl ester selected from the class consisting of allyl acetate, allyl bromide, allyl methacrylate, allyl beta-cyclohexyl propionate, and diallyl phenyl phosphate.

3. A process according to claim 1 in which trioxan is reacted with an allyl ester and with at least one other compound capable of copolymerising with trioxan in the presence of an electrophilic catalyst.

4. A process according to claim 3 in which said other compound is a cyclic ether.

5. A process according to claim 1 in which the reaction is carried out in a continuous manner by continuously withdrawing the polymeric product.

6. A process according to claim 1 in which the reaction is carried out in an inert atmosphere comprising at least one gas selected from the group consisting of nitrogen and carbon dioxide, and in the presence of an inert liquid medium selected from the group consisting of n-hexane and light petroleum fractions in the hexane range which have a boiling point between 60° and 70° C. and which consist mainly of normal paraffins, the allyl ester being homogeneously blended with said trioxan.

7. A process according to claim 1 in which the reaction is carried out in the presence of an inert liquid medium.

8. A process according to claim 7 in which the inert liquid medium is selected from the group consisting of n-hexane and light petroleum fractions in the hexane range which have a boiling point between 60° C. and 70° C. and which consist mainly of normal paraffins.

9. A process according to claim 3 in which the reaction is carried out in molten trioxan, the allyl compound and other reactants being homogeneously blended with said molten trioxan.

10. A process according to claim 1 in which the reaction is carried out at a temperature between −100° C. and 100° C.

11. A process for the preparation of a copolymer by reacting trioxan under substantially anhydrous conditions in the presence of an electrophilic catalyst with an allyl ester, in which the allyl ester is partially polymerised prior to its reaction with trioxan.

12. A process for the preparation of a polymeric product by reacting trioxan with an allyl ester and with at least one other compound capable of copolymerising with trioxan in the presence of an electrophilic catalyst in which the compound capable of copolymerising with trioxan in the presence of an electrophilic catalyst is partially polymerised with trioxan prior to the introduction into the reaction zone of the other reactant or reactants.

13. A polymeric product produced by reacting trioxan under substantially anhydrous conditions in the presence of an electrophilic catalyst with at least one allyl ester.

14. A polymeric product produced by reacting trioxan under substantially anhydrous conditions in the presence of an electrophilic catalyst with at least one allyl ester together with at least one other compound capable of copolymerising with trioxan in the presence of an electrophilic catalyst.

15. A process according to claim 1 in which the ester is allyl acetate.

16. A process according to claim 15 in which the water content of the reaction medium is less than 0.1 percent, the reaction is carried out in an inert atmosphere and in the presence of an inert liquid medium at a temperature of between −100° C. and 100° C., in the presence of an electrophilic catalyst of boron trifluoride-diethyl ether complex, and in which the reactants which are reacted with the trioxan constitute from 0.5% to 20% by weight of the total weight of the reactants and trioxan.

References Cited by the Examiner

UNITED STATES PATENTS

| 2,173,005 | 9/1939 | Strain | 260—73 |
| 3,087,913 | 4/1963 | Kray et al. | 260—73 |
| 3,144,431 | 8/1964 | Dolce et al. | 260—67 |

OTHER REFERENCES

Angewandte: Chemie 73, No. 6, March 21, 1961, pp. 177–186.

JOSEPH L. SCHOFER, *Primary Examiner.*

NORMAN G. TORCHIN, *Examiner.*

W. G. GOODSON, J. A. SEIDLECK,
*Assistant Examiners.*